(12) United States Patent
Uehara

(10) Patent No.: US 6,978,695 B2
(45) Date of Patent: Dec. 27, 2005

(54) FLYWHEEL ASSEMBLY

(75) Inventor: Hiroshi Uehara, Hirakata (JP)

(73) Assignee: Exedy Corporation, Neyagawa (JP)

( * ) Notice: Subject to any disclaimer, the term of this patent is extended or adjusted under 35 U.S.C. 154(b) by 190 days.

(21) Appl. No.: 10/429,701

(22) Filed: May 6, 2003

(65) Prior Publication Data

US 2003/0217616 A1   Nov. 27, 2003

(30) Foreign Application Priority Data

May 21, 2002   (JP)   ............................. 2002-145727

(51) Int. Cl.$^7$ ............................................. F16F 15/10
(52) U.S. Cl. ......................... 74/574; 74/572; 74/573 R
(58) Field of Search ............................ 74/572, 573 R, 74/574; 192/70.17, 214.1; 464/24, 68

(56) References Cited

U.S. PATENT DOCUMENTS

| | | | | |
|---|---|---|---|---|
| 4,565,273 A | * | 1/1986 | Tojima et al. | 192/208 |
| 4,577,742 A | * | 3/1986 | Saida | 192/213.22 |
| 5,690,208 A | * | 11/1997 | Uehara | 192/214.1 |
| 5,713,796 A | * | 2/1998 | Fukamachi | 464/24 |
| 5,715,922 A | * | 2/1998 | Imanaka | 192/213.22 |
| 5,730,656 A | * | 3/1998 | Yamamoto | 464/24 |
| 5,935,008 A | * | 8/1999 | Mizukami | 464/68 |
| 6,168,526 B1 | * | 1/2001 | Uenohara et al. | 464/68 |
| 6,375,575 B2 | * | 4/2002 | Hashimoto | 464/68 |
| 6,615,967 B2 | * | 9/2003 | Uehara | 192/70.17 |
| 2002/0010028 A1 | * | 1/2002 | Shibata et al. | 464/68 |
| 2002/0056599 A1 | * | 5/2002 | Suzuki | 192/3.25 |
| 2005/0037848 A1 | * | 2/2005 | Yamamoto et al. | 464/68 |

FOREIGN PATENT DOCUMENTS

JP   8-82343   * 3/1996   .................. 74/574

OTHER PUBLICATIONS

McGraw-Hill Dictionary of Scientific and Technical Terms, 1976, p. 571.*

* cited by examiner

*Primary Examiner*—Vinh T. Luong
(74) *Attorney, Agent, or Firm*—Shinjyu Global IP Counselors, LLP

(57) ABSTRACT

A flywheel assembly 1 is configured to transmit a torque from a crankshaft of an engine to an input shaft 6 of a transmission, and includes a flywheel 2 and a damper mechanism 3. The flywheel 2 receives torque from the crankshaft. The damper mechanism 3 includes a pair of disk shaped plates 11 and 12 fixed together and coupled to the flywheel 2, a hub 15 having a flange 20 arranged between the paired disk shaped plates 11 and 12 and transmitting a torque to the input shaft 6, and coil springs 16 and 17 that are compressed in a rotational direction when relative rotation occurs between the disk shaped plate pair 11 and 12 and the flange 20. A torsion angle stopper 30 is formed for stopping the relative rotation between the disk shaped plate pair 11 and 12 and the hub 15. This configuration serves to prevent application of an excessively large torque to the elastic member in the flywheel assembly.

13 Claims, 4 Drawing Sheets

FLYWHEEL ASSEMBLY

BACKGROUND OF THE INVENTION

1. Field of the Invention

The invention relates to a flywheel assembly, and more particularly to a flywheel assembly for transmitting torque from a crankshaft of an engine to an input shaft of a transmission.

2. Background Information

Generally, a flywheel is coupled to a crankshaft of an engine and serves to absorb the combustion vibrations of the engine. In a flywheel assembly known in the prior art, a damper mechanism is combined with the flywheel, and a torsional vibration damping system is divided into input and output sides with respect to the damper mechanism.

The flywheel assembly is formed of, e.g., a first flywheel on the input side, a second flywheel on the output side and a damper mechanism for elastically coupling these flywheels together in the rotational direction. The damper mechanism includes a plurality of coil springs, and further includes a friction generating mechanism and a viscous resistance generating mechanism. A clutch cover assembly is attached to a second flywheel, and a frictional coupling portion of the clutch disk assembly is arranged between a friction surface of the second flywheel and a pressing surface of a pressure plate. The clutch disk assembly is coupled to the input shaft of the transmission.

The flywheel assembly is configured to transmit a torque directly to the input shaft of the transmission without passing the torque through the clutch cover assembly and the clutch disk assembly. The flywheel assembly has a damper mechanism similar to the damper mechanism of the clutch disk assembly, and has a hub coupled to the input shaft. The flywheel is fixed to both or either of members on input and output sides of the damper mechanism.

The flywheel assembly transmitting the torque directly to the input shaft of the transmission includes a pair of disk shaped members, which are fixed together and are coupled to the flywheel, a hub, which has a flange arranged between the paired disk shaped members and is configured to transmit the torque to the input shaft, and an elastic member, which is arranged in the rotating direction between the disk shaped member pair and the flange, and is compressed in the rotating direction when relative rotation occurs therebetween. The flywheel is arranged between radially outer portions of the paired disk shaped members, and is fixed thereto by rivets.

The aforementioned flywheel assembly suffers from the following two problems.

First, the flywheel assembly does not have a torsion angle stopper for restricting the relative rotation or torsion angle between the disk shaped member on the input side and the hub. Therefore, when a shock torque is applied, the coil spring may receive an excessively large torque, and thus may be broken, or its durability may be impaired.

Second, the disk shaped member on the input side extends radially outward beyond the outer periphery of the hub flange, and thereby provides a riveting portion. Therefore, the radial position of the rivets cannot be shifted sufficiently toward the center of the disk shaped member so that the damper mechanism and therefore the flywheel assembly cannot have sufficiently small outer diameters.

Thus, an object of the invention is to provide a flywheel assembly configured to transmit a torque directly to an input shaft of a transmission, and particularly one which can prevent input of an excessively large torque to an elastic member.

Another object of the invention is to provide a flywheel assembly configured to transmit a torque directly to an input shaft of a transmission, and particularly one which has a sufficiently reduced radial size.

SUMMARY OF THE INVENTION

According to a first aspect of the invention, a flywheel assembly for transmitting torque from a crankshaft of an engine to an input shaft of a transmission includes a flywheel and a damper mechanism. The flywheel receives the torque from the crankshaft. The damper mechanism includes a pair of disk shaped members fixed together and coupled to the flywheel, a hub having a flange arranged between the paired disk shaped members and transmitting the torque to the input shaft, and an elastic member being compressed in a rotating direction when relative rotation occurs between the disk shaped member pair and the flange. A torsion-angle stopper is formed for stopping the relative rotation between the disk shaped member pair and the hub.

In this flywheel assembly, the torque is transmitted from the disk shaped member pair to the hub via the elastic member, and is finally transmitted to the input shaft. When torsional vibrations are input from the engine, the disk shaped member pair rotates relative to the hub, and the elastic member is compressed therebetween. Consequently, the torsional vibrations are absorbed or damped. The flywheel functions as an inertial member on the input side.

When the torsion angle between the disk shaped member pair and the hub increases in this flywheel assembly, the torsion-angle stopper stops the relative rotation between the disk shaped member pair and the hub. Because the torsion-angle stopper is employed, the elastic member in the flywheel assembly, which is configured to transmit the torque directly to an input shaft of a transmission, is prevented from receiving an excessively large torque.

According to a second aspect of the invention, the torsion angle stopper includes a first projection provided on the disk shaped member, and a second projection provided on the flange which faces the first projection in the rotating direction with a space therebetween.

In this flywheel assembly, the torsion angle stopper has a simple structure formed of the first and second projections.

According to a third aspect of the invention, the first and second projections are plate members in which cross-sectional surfaces thereof come into contact with each other in the rotational direction.

In this flywheel assembly, the first and second projections are plate members in which cross-sectional surfaces thereof come into contact with each other in the rotational direction, and thus have simple structures.

According to a fourth aspect of the invention, the first and second projections project radially outward.

According to this flywheel assembly, the first and second projections project radially outward so that the axial size is reduced.

According to a fifth aspect of the invention, the first projection extends radially inward from a radially outer portion of the disk shaped member, and is surrounded by a recess.

According to a sixth aspect of the invention, the flywheel assembly further includes a rivet arranged in a fixing portion formed from the first projection of the disk shaped member and the corresponding radially outer portion and serves to fix the disk shaped member to the flywheel.

According to this flywheel assembly, because the rivet is arranged in the fixing portion formed from the first projection and the corresponding radially outer portion, the rivet can be arranged in a position that is shifted radially inward from that in a conventional structure. Accordingly, the radial sizes of the damper mechanism and therefore the flywheel assembly can be reduced. In a conventional fixing portion, disk shaped members have radially outer portions, which are located radially outside the outer periphery of the flange, and are in contact with each other, so that the radial position of the rivet cannot be sufficiently shifted inward.

According to a seventh aspect of the invention, the first projections of the paired disk shaped members are in axial contact with each other to form one stopper portion.

According to this flywheel assembly, the stopper portion can have an increased strength because the first projections of the paired disk shaped members are in axial contact with each other to form one stopper portion.

According to an eighth aspect of the invention, the paired disk shaped members have the same shape.

According to this flywheel assembly, since the paired disk shaped members have the same form, the number of types of disk shaped members so that the cost of manufacturing them is reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS (1) Overall Structure

Figure 1:
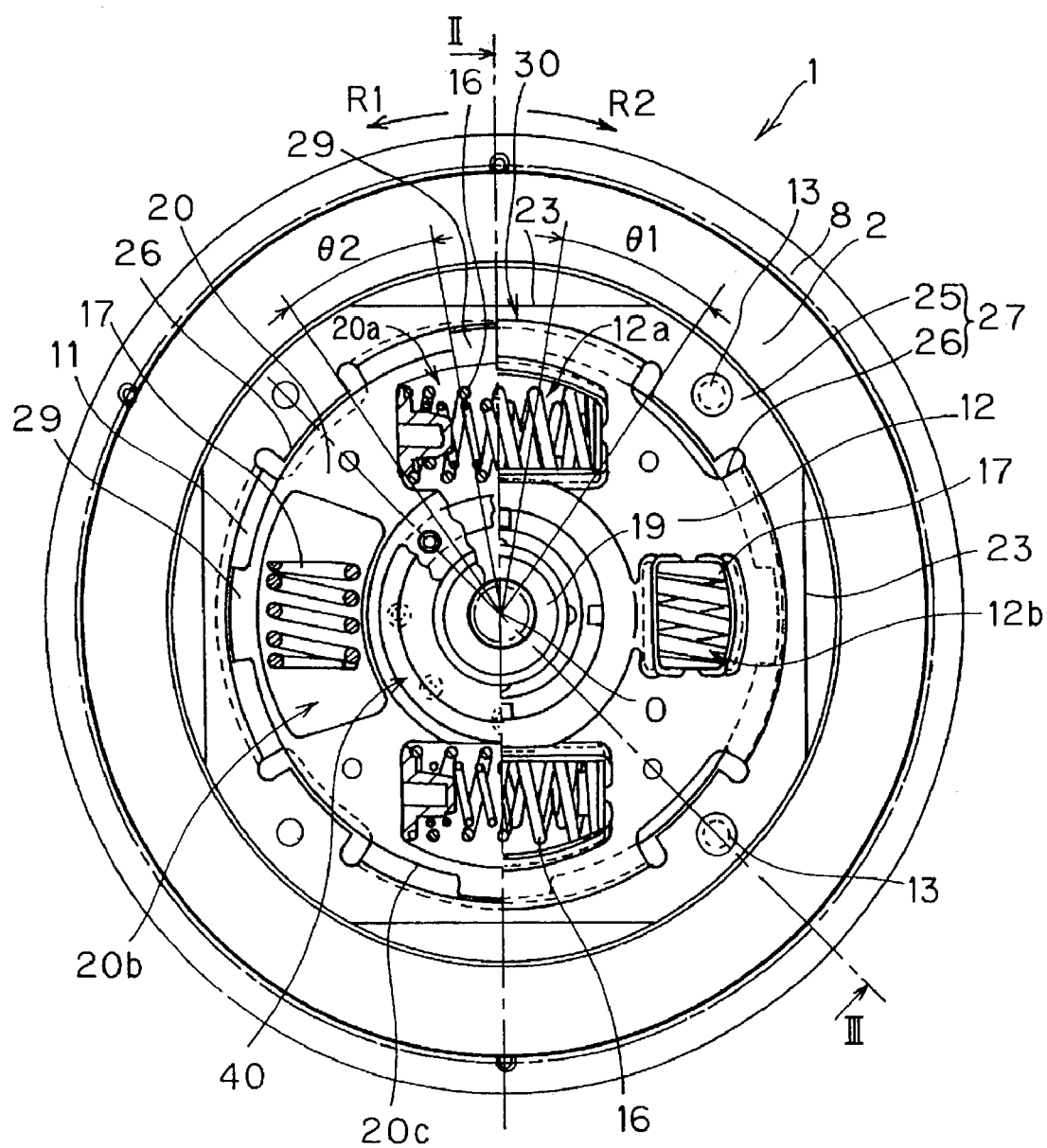
FIG. 1 is a plan view of a flywheel assembly of an embodiment of the invention.
Figure 2:
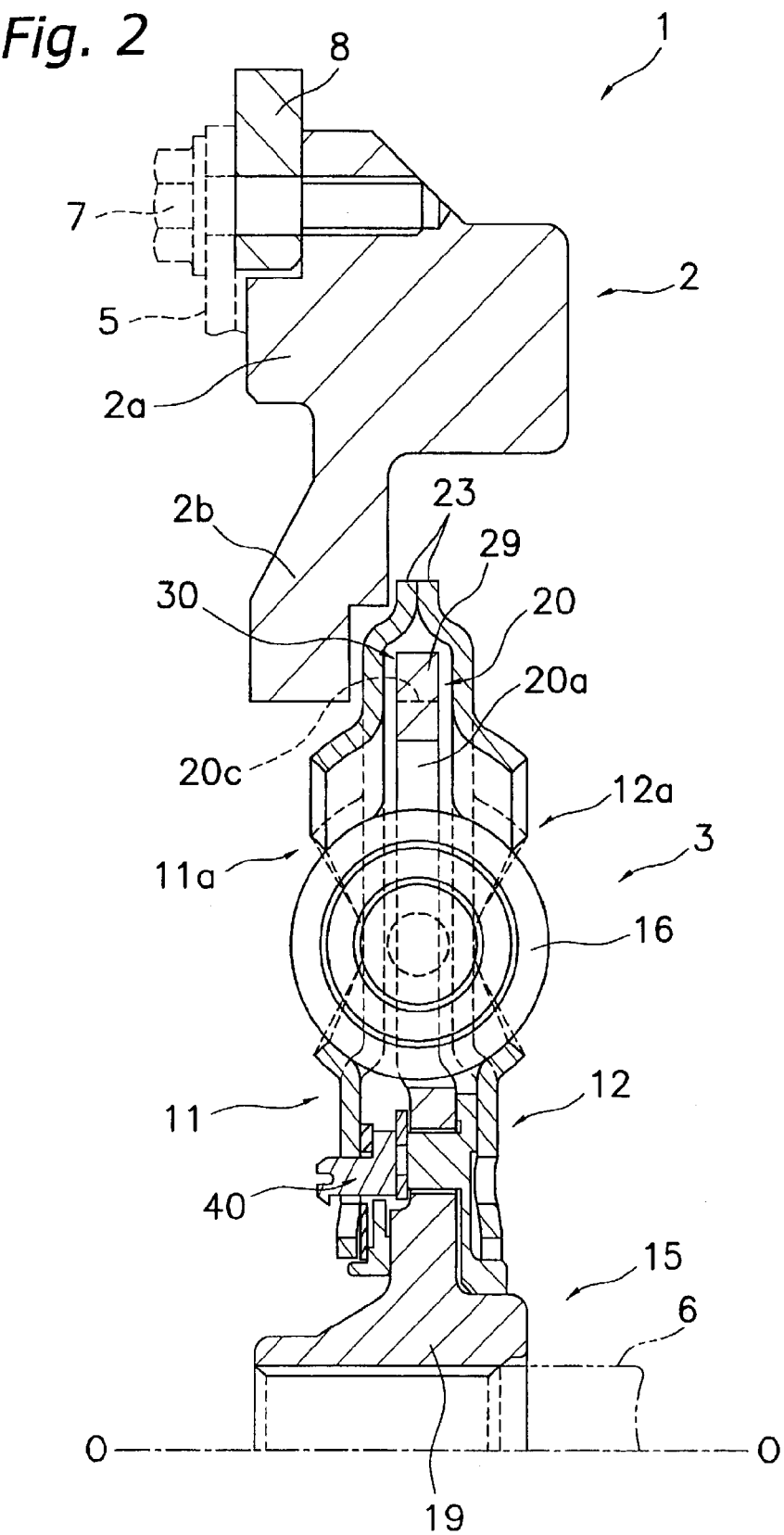
FIG. 2 is a cross section of the flywheel assembly taken along line I-O in FIG. 1.
Figure 3:
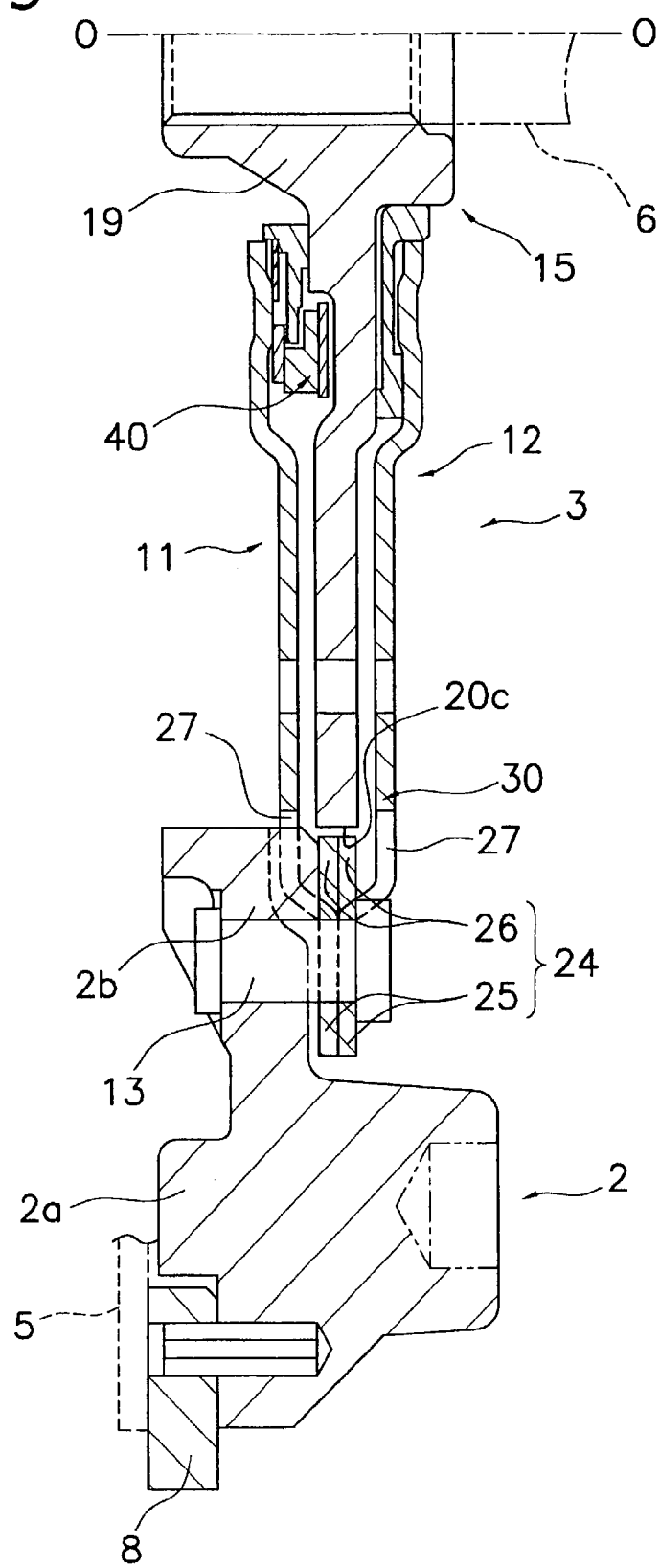
FIG. 3 is a cross section of the flywheel assembly taken along line O-II in FIG. 1.

FIGS. 1 to 3 show a flywheel assembly 1 of an embodiment of the invention. The flywheel assembly 1 is a mechanism for transmitting torque from a crank shaft (not shown) of an engine to a transmission (not shown). In FIG. 1, an arrow R1 indicates a positive rotating direction of the flywheel assembly 1, and an arrow R2 indicates a negative rotating direction. In FIGS. 2 and 3, which are cross sections of the flywheel assembly 1, the engine is arranged on the left side, and the transmission is arranged on the right side. In FIGS. 2 and 3, O—O indicates a rotation axis of the flywheel assembly 1.

More specifically, flywheel assembly 1 is a device for receiving the torque from a flexible plate 5 (engine side member), and transmitting the torque to an input shaft 6 of the transmission, and is primarily formed of a flywheel 2 and a damper mechanism 3. In the following description, an "axial direction", a "rotating direction" and a "radial direction" are determined based on a rotating body formed of the damper mechanism 3, unless otherwise specified.

(2) Flywheel

The flywheel 2 is an annular member arranged in a radially outer position. The flywheel 2 has a large thickness or axial length as a whole, and can increase an inertial moment of the flywheel assembly 1. More specifically, the flywheel 2 is formed of a radially outer portion 2a having a large thickness and a radially inner portion 2b having a small thickness. The radially outer portion of the flexible plate 5 is fixed to a side surface (i.e., radial surface) on the engine side of the radially outer portion 2a by a plurality of bolts 7 with an annular plate 8 therebetween. An input portion of the damper mechanism 3 is fixed to a side portion of the radially inner portion 2b on the transmission side, as will be described below.

(3) Damper Mechanism

The damper mechanism 3 is a mechanism for transmitting torque, and for absorbing and damping torsional vibrations. The damper mechanism 3 is primarily formed of a pair of disk shaped plates 11 and 12 that are fixed together, a hub 15 having a flange 20 arranged between the paired disk shaped plates 11 and 12 which serves to transmit torque to the input shaft 6, and a plurality of coil springs 16 and 17 which are arranged substantially in the rotating direction between the disk shaped plate pair 11 and 12 and the flange 20, and which are compressed when the disk shaped plate pair 11 and 12 rotates relatively to the flange 20.

(3-1) Disk Shaped Plates

The paired disk shaped plates 11 and 12 are formed of circular and annular thin plates prepared by press working, respectively, and are axially opposed to each other. In this embodiment, the paired disk shaped plates 11 and 12 have the same shape and are interchangeable. The disk shaped plate 11 has a pair of first windows 11a and a pair of second windows 11b. The paired first windows 11a are opposed diametrally (i.e., in the longitudinal direction of FIG. 1) to each other, and the paired second windows 11b are opposed diametrally (i.e., in the lateral direction of FIG. 1) to each other. Each of the first and second windows 11a and 11b is formed of an axial through hole, and is defined by a bent portion extending axially outward from the edge of the hole. The second window portion 11b is circumferentially shorter than the first window 11a. Likewise, the disk shaped plate 12 has first and second windows 12a and 12b.

Next, a fixing portion 24 and rivets 13 for the disk shaped plates 11 and 12 will be described. Linear portions 23 prepared by linearly cutting portions of the circular edge of the disk shaped plate 11 are formed at four circumferentially spaced positions on the outer periphery thereof, and fixing portions 24 are provided between the linear portions 23. Each fixing portion 24 is primarily formed of a radially outer portion 25 and a first projection 26 extending radially inward from the radially outer portion 25. The radially outer portion 25 is a flat disk shaped portion extending radially outside the flange 20, and is located in a position shifted axially toward the transmission (i.e., toward the disk shaped plate 12) from the main body of the plate 11. The first projection 26 extends radially from the inner periphery of the radially outer portion 25, and has a predetermined width in the rotating direction. As shown in FIG. 3, the first projection 26 is flush with the radially outer portion 25, and is formed to be continuous therewith. A recess 27 is formed in the radially inner side and the circumferentially opposite sides of each first projection 26. The recess 27 separates the first projection 26 from the surrounding portion. A radially inner surface 26a and circumferentially opposite side surfaces 26b of the first projection 26 are plate cross-sections, respectively.

The disk shaped plate 12 is likewise provided with radially outer portions 25, first projections 26 and recesses 27. The radially outer portions 25 and the first projections 26 of the disk shaped plate 11 are axially in contact with those of the disk shaped plate 12, respectively. Further, the radially outer portions 25 and the first projections 26 of the disk shaped plate 11 are in contact with the side surface on the transmission side of the radially inner portion 2b of the flywheel 2. In this state, the rivets 13 are fitted into the apertures formed in the flywheel 2 and the plates 11 and 12. Heads of each rivet 13 have larger diameters than its shank so that axial separation of the fixed members is prevented. In the radially outer portion 25 and the first projection 26, the circumferential position of the rivet hole, which is the same as the circumferential position of the rivet 13, matches with the center of the first projection 26, and the radial position thereof is shifted radially inward (toward the first projection 26) from the radially outer portion 25. As described above, the radially outer portion 25 and the first projection 26 function as the fixing portion 24 of the rivet 13.

(3-2) Hub

The hub 15 is formed of a cylindrical boss 19 and a flange 20 extending radially outward from an outer peripheral surface of the boss 19. The boss 19 is arranged within the central holes of the plates 11 and 12, and has a splined aperture engaged with the input shaft 6. The flange 20 is arranged axially between the plates 11 and 12. The flange 20 is provided with first window holes 20a corresponding to the first windows 11a and 12a in the plates 11 and 12, and is also provided with second window holes 20b corresponding to the second windows 11b and 12b in the plates 11 and 12. Each first window hole 20a has a form similar to those of the first windows 11a and 12a. Because each second window hole 20b is circumferentially longer than the second windows 11b and 12b, they extend circumferentially beyond the opposite ends of each of the second windows 11b and 12b.

The flange 20 is provided at its outer periphery 20c with second projections 29 projecting radially outward. The second projections 29 are located in circumferential positions corresponding to those of the window holes 20a and 20b, and are located circumferentially between the first projections 26 of the plates 11 and 12. As shown in FIG. 2, the second projections 29 are flush with the main portion. Each second projection 29 has a predetermined width in the rotating direction. The first and second projections 26 and 29 have edge surfaces (i.e., surfaces substantially facing in the circumferential direction), which are located in the same radial position. Therefore, when a torsion angle of the plates 11 and 12 with respect to the flange 20 increases, the first and second projections 26 and 29 collide with each other to stop the relative rotation of the plates 11 and 12 with respect to the flange 20. In this manner, portions of the disk shaped plates 11 and 12 cooperate with a portion of the flange 20 to form a torsion angle stopper 30 for stopping the relative rotation of the disk shaped plate pair 11 and 12 with respect to the hub 15.1

Figure 4:
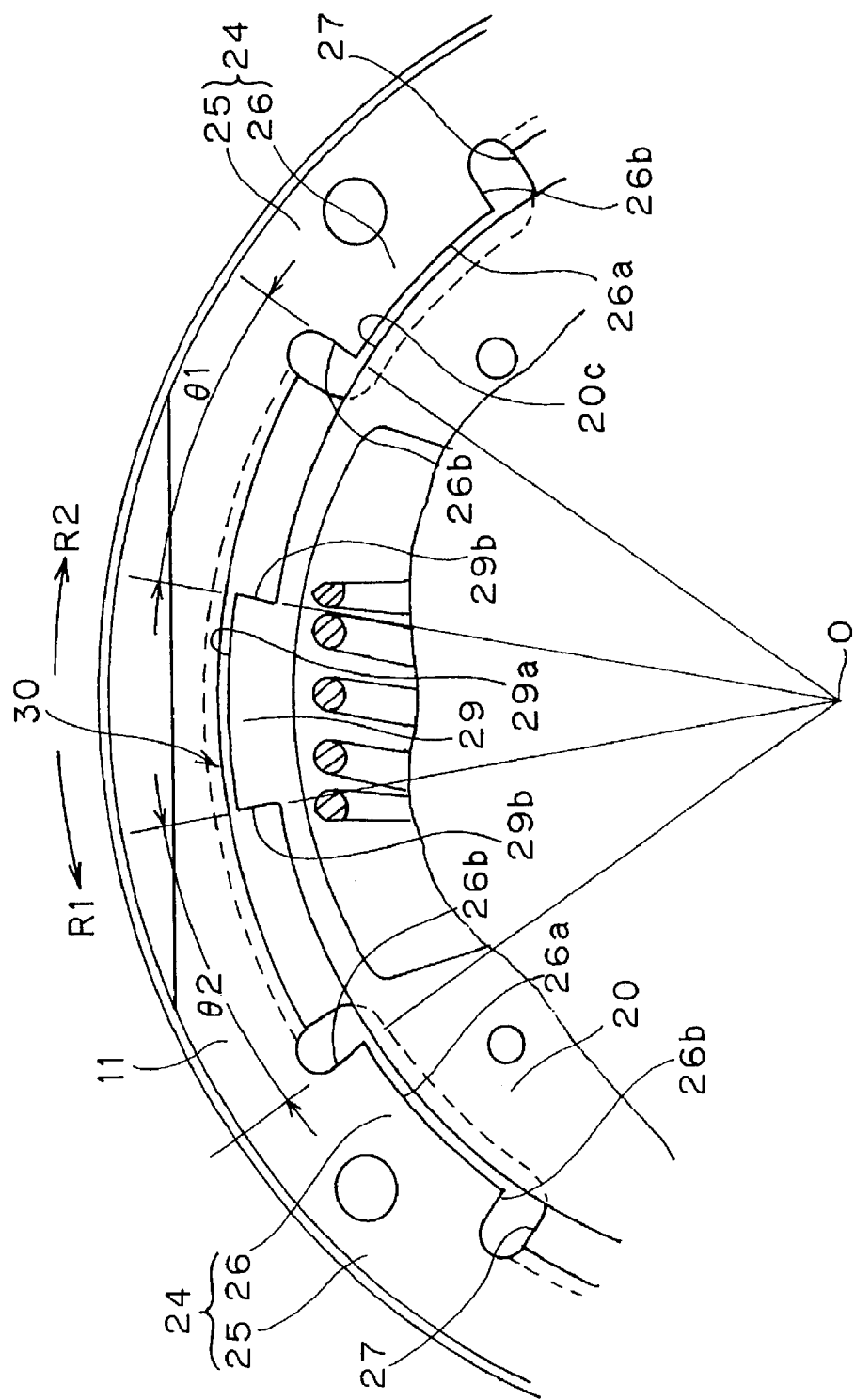
FIG. 4 is a fragmentary view showing, on an enlarged scale, a torsion angle stopper.

Referring now to FIG. 4, the torsion angle stopper 30 will now be described in greater detail. A torsion angle θ2 is circumferentially maintained between the second projection 29 and the first projection 26 shifted therefrom in the rotating direction R1, and a torsion angle θ1 is kept between the second projection 29 and the first projection 26 shifted therefrom in the rotating direction R2. The first projection 26 is defined by the plate cross-sections, i.e., the radially inner surface 26a and the circumferentially opposite side surfaces 26b. The radially inner surface 26a of the first projection 26 is radially close to the outer periphery 20c of the flange 20. The second projection 29 is defined by the plate cross-sections, i.e., an outer peripheral surface 29a and the circumferentially opposite side surfaces 29b. The second projection 29 extends radially outward from the outer periphery 20c, and is located radially outside the radially inner surface 26a of the first projection 26. Consequently, the circumferentially opposite side surfaces 26b of each projection 26 are in the axial and radial positions corresponding to those of the circumferentially opposite side surfaces 29b of the second projection 29, so that these surfaces 26b and 29b come into contact with each other when the torsion angle of the plates 11 and 12 with respect to the flange 20 increases. In particular, the first projection 26 is formed of the portions of the plates 11 and 12 which are in contact with each other, and has the same thickness as the second projection 29. Therefore, the contact portions of the torsion-angle stopper 30 can have a sufficiently large area so that the breakage and wearing of the contact portions can be suppressed.

(3-3) Coil Spring

The first coil spring 16 is arranged in the space formed of the first window hole 20a and the first windows 11a and 12a. The first coil spring 16 is formed of two kinds of coaxial coil springs that have circumferentially opposite ends, and which are in contact with or close to the edges of the first windows 11a and 12a as well as the edges of the first window hole 20a. The second coil spring 17 is arranged in the space formed of the second window hole 20b and the second windows 11b and 12b. The circumferentially opposite ends of the second coil spring 17 are in contact with the edges of the second windows 11b and 12b, but are spaced by large distances in the rotating direction from the edges of the second window hole 20b.

(3-4) Friction Generating Mechanism

A friction generating mechanism 40 formed of a plurality of plates and springs is arranged between the inner peripheral portions of the plates 11 and 12 and the inner peripheral portion of the flange 20. The friction generating mechanism 40 is a mechanism for generating a predetermined friction, i.e., a hysteresis torque when the plates 11 and 12 rotate relative to the hub 15.

(4) Operation

A torque is supplied from the crankshaft of the engine to the flywheel assembly 1 via the flexible plate 5 so that the flywheel assembly 1 rotates, and the input shaft 6 rotates. More specifically, the torque is transmitted through the flywheel 2, disk shaped plates 11 and 12, coil springs 16 and 17 to the hub 2.

For example, when the flywheel assembly 1 receives combustion vibrations from the engine, the disk shaped plates 11 and 12 rotate relatively to the hub 15 so that the coil springs 16 and 17 are repetitively compressed. At the same time, the friction generating mechanism 40 generates friction. Thereby, the damper mechanism 3 of the flywheel assembly 1 sufficiently absorbs or damps the torsional vibrations. In a region of a small torsion angle of the torsion characteristics, only the first coil springs 16 are compressed so that a relatively low rigidity is exhibited. In a region of a large torsion angle, the first and second coil springs 16 and 17 are compressed in parallel so that a relatively high rigidity is exhibited.

As the torsion angle of the disk shaped plates 11 and 12 with respect to the hub 15 increases, the circumferentially opposite end surfaces of the first and second projections 26 and 29 collide with each other, and thus the torsion angle stopper 30 operates to stop the relative rotation between these plates and the hub.

(5) Function and Effect of the Torsion-Angular Stopper (5-1) Because the flywheel assembly 1 includes the torsion angle stopper 30, the elastic member in the flywheel assembly which transmits directly the torque to the input shaft of the transmission can be prevented from receiving an excessively large torque.

(5-2) The torsion-angular stopper 30 has a simple structure formed of the first and second projections 26 and 29. The first and second projections 26 and 29 have plate cross-sections for contact with each other in the rotating direction, and thus have simple structures. A reduction in size can be achieved because the first and second projections 26 and 29 project in the radial direction.

(5-3) The stopper can have an increased strength because the paired disk shaped plates 11 and 12 have first projections 26 which are in axial contact with each other to form the stopper.

(5-4) Because the paired disk shaped plates 11 and 12 have the same shape, fewer types of disk shaped plates can be used, which lowers the cost of manufacturing.

(5-5) Since the rivets 13 are arranged in the fixing portion formed from the first projections 26 and the corresponding radially outer portions 25, the rivets 13 can be located in the radially inner position, as compared with a conventional structure. Accordingly, the damper mechanism 3 and thus the flywheel assembly 1 can have reduced radial sizes.

A conventional fixing portion is formed of radially outer portions of disk shaped plates, which are located radially outside a flange and are in contact with each other. Therefore, rivets cannot be shifted sufficiently inward in the radial direction.

(6) Dimensional Relationship Between the Flywheel and the damper Mechanism.

The flywheel 2 is disposed radially outward of the damper mechanism 3 so that it is possible to provide enough inertia to the flywheel assembly 1. The radially outer portion 2a is a main portion of the flywheel 2 and the radially inner portion 2b is a coupling portion coupled to the paired plates 11 and 12. The radially outer portion 2a of the flywheel 2 is longer than the radially inner portion 2b of the flywheel 2 in the axial direction such that the radially outer portion 2a of the flywheel 2 surrounds the damper mechanism 6. In particular, the coil spring 16 is confined in an axial region defined by the axially outermost edges of the radially outer portion 2a of the flywheel 2. As a result, it is possible to maintain sufficient inertia and thinness in the flywheel assembly 1.

(7) Other Embodiments

The invention is not restricted to the foregoing embodiment, and can be modified or changed in a variety of ways without departing from the scope of the invention.

For example, the invention may be applied to a structure in which the hub and the flange are separated from each other, and are connected together in the rotating direction through elastic members having a low rigidity.

According to the flywheel assembly of the invention, as described above, when the torsion angle between the disk shaped member pair and the hub increases, the torsion-angle stopper stops the relative rotation between the disk shaped member pair and the hub. Because a torsion-angle stopper is employed, the elastic members in a flywheel assembly which is configured to transmit the torque directly to the input shaft of the transmission are prevented from receiving an excessively large torque.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A flywheel assembly for transmitting a torque from an engine side member to an input shaft comprising:
    a flywheel being configured to receive torque from the engine side member; and
    a damper mechanism comprising a pair of disk shaped members being fixed together and coupled to said flywheel, a hub having a flange arranged between said pair of disk shaped members, said hub being configured to transmit torque to the input shaft, and an elastic member that is compressed in a rotating direction when relative rotation occurs between said pair of disk shaped members and said flange,
    a torsion angle stopper being formed between the disk shaped member pair and the hub to stop relative rotation therebetween, said torsion angle stopper having a first projection provided on each of said pair of disk shaped members, and a second projection provided on said flange facing said first projections in the rotating direction with a space therebetween.

2. The flywheel assembly according to claim 1, wherein said first and second projections are plate members in which cross-sectional surfaces thereof come into contact with each other in the rotating direction.

3. The flywheel assembly according to claim 1, wherein each of said first and second projections project in the radial direction.

4. The flywheel assembly according to claim 1, wherein said first projections extend radially inward from a radially outer portion of said pair of disk shaped members and are surrounded by a recess.

5. The flywheel assembly according to claim 4, further comprising,
    a rivet arranged in a fixing portion formed from said first projections of said disk shaped member and said radially outer portion, said rivet serving to fix said pair of disk shaped members to said flywheel.

6. The flywheel assembly according to claim 5, wherein said first projections of said pair of disk shaped members are in axial contact with each other to form one stopper portion.

7. The flywheel assembly according to claim 6, wherein said pair of disk shaped members have the same shape.

8. The flywheel assembly according to claim 1, wherein said first projections of said pair of disk shaped members are in axial contact with each other to form one stopper portion.

9. The flywheel assembly according to claim 8, wherein said pair of disk shaped members have the same shape.

10. The flywheel assembly according to claim 1, wherein said flywheel is disposed radially outward of said damper mechanism, and
    said flywheel has a main portion and a coupling portion coupled to said pair of disk shaped members.

11. The flywheel assembly according to claim 10, wherein said main portion of said flywheel is longer than said coupling portion of said flywheel in the axial direction.

12. The flywheel assembly according to claim 10, wherein said main portion of said flywheel surrounds said damper mechanism.

13. The flywheel assembly according to claim 12, wherein said elastic member is confined in an axial region defined by axially outermost edges of said main portion of said flywheel.

* * * * *